Figure 1:
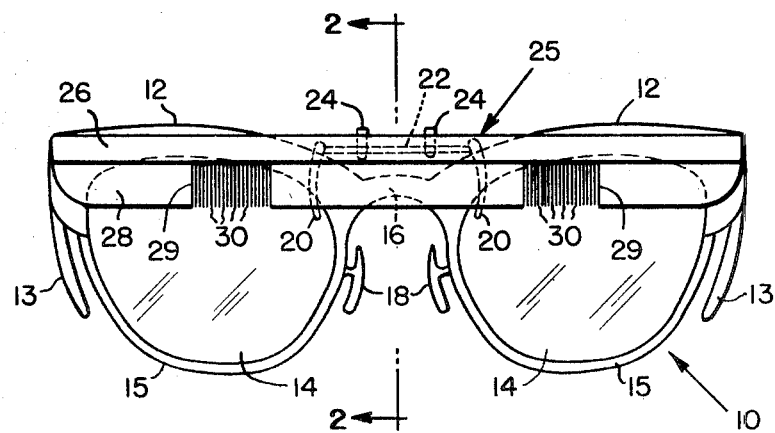

United States Patent

[11] 3,597,052

| | | |
|---|---|---|
| [72] | Inventor | Paul E. Dittman<br>161 Tobey Road, Pittsford, N.Y. 14534 |
| [21] | Appl. No. | 826,954 |
| [22] | Filed | May 22, 1969 |
| [45] | Patented | Aug. 3, 1971 |

[54] ANTIGLARE ATTACHMENT FOR SPECTACLES
2 Claims, 2 Drawing Figs.

[52] U.S. Cl. ................................................. 351/45,
2/14 J, 351/46, 351/47
[51] Int. Cl. ...................................................... G02c 7/16,
G02c 9/04
[50] Field of Search ............................................ 351/47, 45,
46, 44; 2/13, 14.9, 12

[56] References Cited
UNITED STATES PATENTS
1,963,716  6/1934  Ritchey .................... 351/47 UX
2,796,610  6/1957  Doorenbos .................. 351/45 X
3,413,057  11/1968  Carmichael .................. 351/47

FOREIGN PATENTS
1,200,574  6/1959  France ........................ 351/47

Primary Examiner—David Schonberg
Assistant Examiner—John W. Leonard
Attorney—B. Edward Shlesinger ABSTRACT: This device comprises an elongate bar and two laterally spaced groups of spaced parallel blades that are vertical when in use. The two groups of blades are disposed in front of two notches in a tinted plastic strip also carried by the bar. The bar may be removably secured on a spectacle frame by spring clips; and the spring clips may be fastened to a shaft pivotally mounted on straps that are secured to the bar; so that the antiglare device can be swung up out of the way during daylight or swung down in front of the spectacles for use at night or when the sun is low.

PATENTED AUG 3 1971 3,597,052

INVENTOR.
PAUL E. DITTMAN
BY
ATTORNEY

ANTIGLARE ATTACHMENT FOR SPECTACLES

This invention relates primarily to spectacles, and more particularly to a novel light filter which is attachable to the spectacle frames of an automobile driver, for reducing headlight glare or the annoyance of the sun rays when the sun is low.

The glare of oncoming headlights is one of the most annoying, and often dangerous, factors encountered by a person who operates an automotive vehicle at night. It is particularly objectionable on rainy nights, when headlights of approaching vehicles are reflected off the wet pavement into the eyes of a driver. This glare could be eliminated if the driver were to wear conventional sunglasses, but such glasses obviously are not practical for night driving.

The glare from the rays of the sun when it is low in the sky, and a driver is driving toward the west into the sun can also be most annoying and dangerous.

One object of this invention, therefore, is to provide an attachment for a spectacle frame, which will reduce objectionable glare from oncoming automotive vehicle headlights or from low sun, but without interfering with safe driving after dark.

To this end, another object of this invention is to provide a novel filter device, which can be removably attached to a conventional spectacle frame for the purpose of filtering out objectionable headlight glare or the rays of the setting sun, and which is insensitive to the variation in interpupillary distance which is encountered with different persons.

Another object of this invention is to provide a removable filter attachment which can be pivotably mounted on a spectacle frame for movement between operative and inoperative positions, respectively, relative to the eyes of the person wearing the frame, thereby to permit both day and night use of the spectacles.

Still another object of the invention is to provide an antiglare device which may be used even by people who do not wear spectacle frames.

Other objects of the invention will be apparent hereinafter from this specification and from the recital of the appended claims, particularly when read in conjunction with the accompanying drawing.

Figure 2:
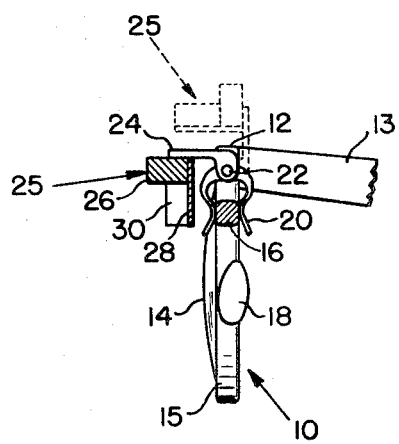

In the drawing:

FIG. 1 is a front elevational view of a spectacle frame having mounted thereon a filter attachment made according to one embodiment of this invention, the attachment being illustrated in its lowered or operative position on the frame; and FIG. 2 is a cross-sectional view taken along the line 2-2 in FIG. 1, looking in the direction of the arrows, and illustrating also in phantom by broken lines the inoperative position of the filter attachment.

Referring now to the drawing by numerals of reference, 10 denotes generally a conventional spectacle frame comprising a front 12, and temples 13 pivoted in the usual manner to opposite temporal ends of the front. The front comprises lenses 14, eyewires 15 for holding the lenses, a bridge 16, and nose pads 18.

The glare filtering device 25 of this invention comprises an elongate supporting bar 26, which is rectangular in cross section, and which is approximately equal in length to the length of the front 12, and elongate, transparent strip 28 of glass or plastic, which is tinted or colored slightly in the manner of the lenses employed in conventional sunglasses, and two spaced grids 30.

Intermediate its ends the strip 28 has two, laterally spaced notches 29, which extend from the lower edge of the strip at least to the bottom of the bar 26. The center to center distance between the notches 29 is equal approximately to the average interpupillary distance between the eyes of a person, that is, in most instances will be equal to the center to center distance between the lenses 14 of the frame.

One of the grids 30 is mounted in front of each notch 29. Each grid comprises a plurality of closely spaced, parallel blades 30, which are fastened at their upper ends, for example by an epoxy adhesive, to the underside of the bar 26, or which may be molded integral with the bar, so that the blades lie in planes normal to the strip 28. It has been found that a suitable spacing for the blades 30 is 0.025 inch, and that the blades should be approximately 0.005 inch thick, and have a depth measured from front to back of approximately 0.250 of an inch. Shim stock may be used for making the blades. The blades are painted black or otherwise treated to have a dull, black finish so as to prevent reflection and diffusion of light during its passage between the blades.

Each notch 29 may be approximately one-half inch in width; and it is desirable that each grid or group of blades 30 overlap opposite ends of the associated notch, so that the overall width of each grid, or group of blades 30, may be slightly greater than one-half inch. This width permits accommodation of the range of variations in interpupillary distance encountered between different persons. Each blade 30, moreover, is fastened to the bar 26 in such a manner that the rear edge of the blade is disposed against, or is coplanar with, the forward face of the strip 28, so that stray light will not be admitted between the strip 28 and the rear ends of the blades 30.

The bar 26, and the whole antiglare filter unit is removably clipped, in the embodiment shown, to the spectacle frame 10 by two, inverted, generally U-shaped clamps or clips 20. At their upper ends the clips 20 are fastened to opposite ends of a shaft 22, which is supported by the clips above the bridge 16. The shaft 22 is carried by a pair of spaced, parallel arms 24, which are fastened at their opposite ends to the upper surface of the bar 26.

In use, the filter 25 is disposed in its operative or full-line position as illustrated in the drawing, so that the driver may look ahead through the grids 30. If the driver does not encounter any oncoming vehicles, he or she may tilt his or her head slightly rearwardly, to view the road in front in normal manner through the unrestricted portions of the lenses 14 beneath the filter 25. However, when the headlights of an oncoming vehicle become objectionable, he or she, by slight forward tilting of the head, may observe the road through the upper portions of the lenses 14 and the grids 30. The blades 30 act to reduce the glare from the headlights of the oncoming vehicle, or from the rays of a low sun, without impairing the vision of the driver wearing the frame 10. Each group of blades 30 extends only part way across the upper edge of each lens 14, so that the person wearing the spectacles will still have peripheral vision through the tinted strip 28 at opposite ends of each group of blades 30. Strip 28 also prevents undesirable side glare from affecting the eyes of the driver.

Where the driver is a person, who does not ordinarily wear spectacles, the antiglare device of this invention, comprising the bar 25, blades 30, and strip 28 can be mounted on a suitable carrier, similar, for instance, to the top rim and temples of the spectacle frame, or may even use a spectacle frame with clear, uncorrected glasses instead of lenses. Various ways of mounting the antiglare device will occur to those skilled in the art.

From the foregoing it will be apparent that applicant has developed a relatively simple and inexpensive device for minimizing the glare from the rays of a sinking sun or from headlights during night driving. Although each group of blades 30 extends only part way across the upper portion of each lens opening in the frame 10, this is perfectly adequate, since at nighttime most of the objectionable glare encountered by a driver occurs from sun rays straight ahead or from the headlights of an oncoming vehicle, from ahead of and slightly to one side of his vehicle. The two spaced sets of blades 30 are of sufficient width to protect him from such glare. The strip 28, on the other hand, functions to minimize objectionable peripheral light while allowing awareness of lights at both sides.

When the filter 25 is not in use, it can be swung upwardly into its inoperative or broken line position as illustrated in FIG. 2; or, alternatively, it can be lifted off the frame 10. The spring clips 20 will yield for this purpose.

Although a specific blade thickness and spacing has been suggested for the grids disclosed herein, it will be understood that these dimensions may be varied slightly, keeping in mind that the ratio of the depth of the blades from front to back to their spacing is a limiting factor. For example, if the blades are set too far apart, light from the approaching vehicle will continue to impinge upon the eye to a point where the glare becomes objectionable. The blades should be spaced close enough that the incident rays from the sinking sun and from the headlights of an approaching vehicle are reflected and cut off by the blades when the vehicle has approached to a point where the glare would, if not cut off, bother the driver. The spacing and length of the blades from one another depend then upon the desired angle of cutoff of the incident rays. However, if the blades are placed too close to one another they will block out too much light. If they are only half the depth shown, from front to rear, obviously they will have to be spaced closer together to accomplish their purpose, in which case thinner blades would have to be used to avoid excessive blocking out of incoming light from ahead.

What I claim is:

1. An antiglare attachment for spectacle frames comprising:
an elongate bar,
a pair of spaced grids extending downwardly from said bar, each of said grids comprising a plurality of closely-spaced, parallel blades, each blade having flat parallel plane side faces extending from front to rear, said blades being fastened at their upper ends to the underside of said bar, and projecting equidistantly downwardly therefrom, and
means for removably mounting said bar on a spectacle frame with said grids disposed in front of the lenses of the frame, an elongate, transparent light filter secured to and projecting downwardly from said bar rearwardly of said grids,
said filter having therein two spaced openings registering with said two grids, respectively.

2. An antiglare attachment for spectacles, comprising:
two spaced grids, each comprising a plurality of parallel spaced, thin, flat, nonreflective blades, each blade having parallel plane sides extending from front to rear of the blade,
each blade being approximately 0.005 inch thick, and having a depth from front to back of approximately 0.250 inch, the sides of all blades being parallel to one another, and the blades being spaced from one another approximately 0.025 inch, and
means for mounting said grids to depend in front of the two lenses of the spectacle, respectively, and extend from the tops of the lenses downwardly.